(12) United States Patent
Huang et al.

(10) Patent No.: US 9,740,651 B2
(45) Date of Patent: Aug. 22, 2017

(54) MOTHERBOARD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Kai-Long Huang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 227 days.

(21) Appl. No.: 14/791,629

(22) Filed: Jul. 6, 2015

(65) Prior Publication Data

US 2016/0342551 A1  Nov. 24, 2016

(30) Foreign Application Priority Data

May 22, 2015  (CN) .......................... 2015 1 0265002

(51) Int. Cl.
   *G06F 13/40*  (2006.01)
   *G06F 13/42*  (2006.01)
   *H05K 7/02*  (2006.01)

(52) U.S. Cl.
   CPC ...... *G06F 13/4068* (2013.01); *G06F 13/4282* (2013.01)

(58) Field of Classification Search
   None
   See application file for complete search history.

Primary Examiner — Chun-Kuan Lee
Assistant Examiner — Dayton Lewis-Taylor
(74) Attorney, Agent, or Firm — Steven Reiss

(57) ABSTRACT

An electronic device includes a motherboard that includes a south bridge, a universal serial bus (USB) 3.0 connector, and a ground module. The south bridge is connected to the USB3.0 connector for transporting USB3.0 signals and USB2.0 signals. The grounded module is connected to the south bridge and the USB3.0 connector. The south bridge is used for controlling the ground module to work. The USB2.0 signals transmit between the south bridge and the USB3.0 connector flow into the ground, while the ground module is working.

12 Claims, 2 Drawing Sheets

MOTHERBOARD

FIELD

The subject matter herein generally relates to a motherboard.

BACKGROUND

Traditional universal serial bus (USB) 3.0 interfaces are compatible with USB2.0 interfaces. That is to say USB3.0 interfaces are capable of transmitting USB3.0 signals and USB2.0 signals. When a motherboard is testing USB3.0 signals, the USB2.0 signals should be failed.

BRIEF DESCRIPTION OF THE DRAWINGS

Implementations of the present technology will now be described, by way of example only, with reference to the attached figures.

DETAILED DESCRIPTION

Figure 1:
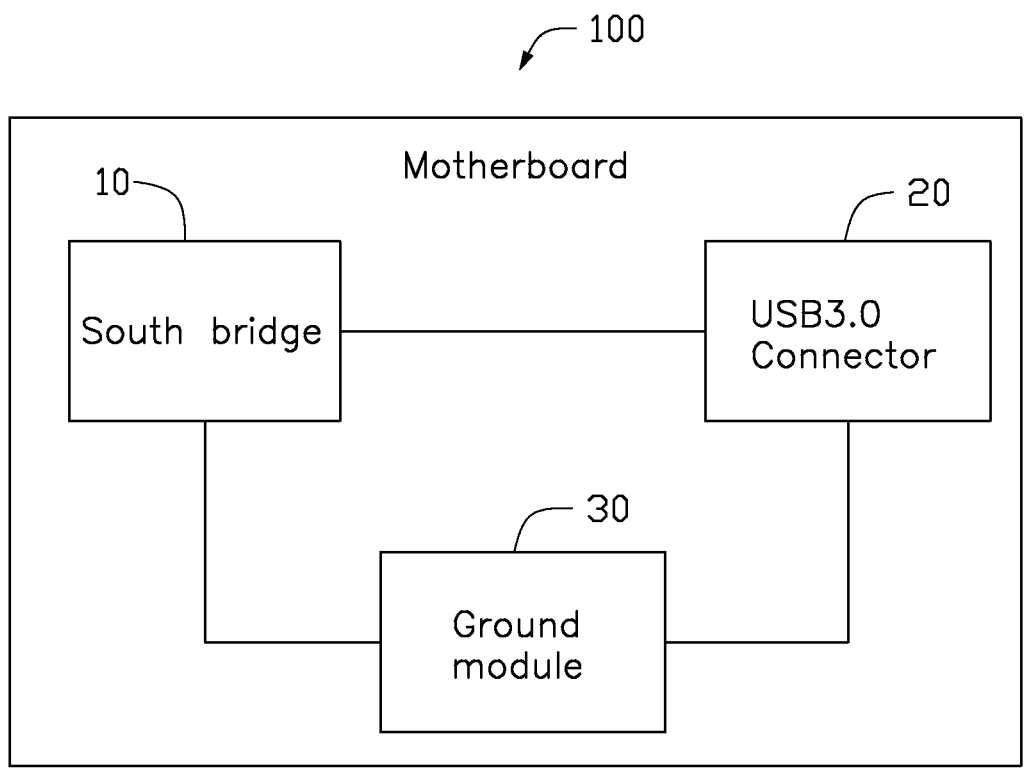
FIG. 1 is a block diagram of an embodiment of a motherboard.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series and the like.

The present disclosure is described in relation to a motherboard.

FIG. 1 illustrates an embodiment of a motherboard 100. The motherboard 100 comprises a south bridge 10, a universal serial bus (USB) 3.0 connector 20, and a ground module 30. The south bridge 10 is coupled to the USB3.0 connector 20 and the ground module 30. The USB3.0 connector 20 is coupled to the ground module 30. The south bridge 10 is capable of transmitting USB3.0 signals and USB2.0 signals to the USB3.0 connector 20, and controlling the ground module 30 to operate. The ground module 30 is capable of transmitting the USB2.0 signals between the south bridge 10 and the USB3.0 connector 20 to the ground.

Figure 2:
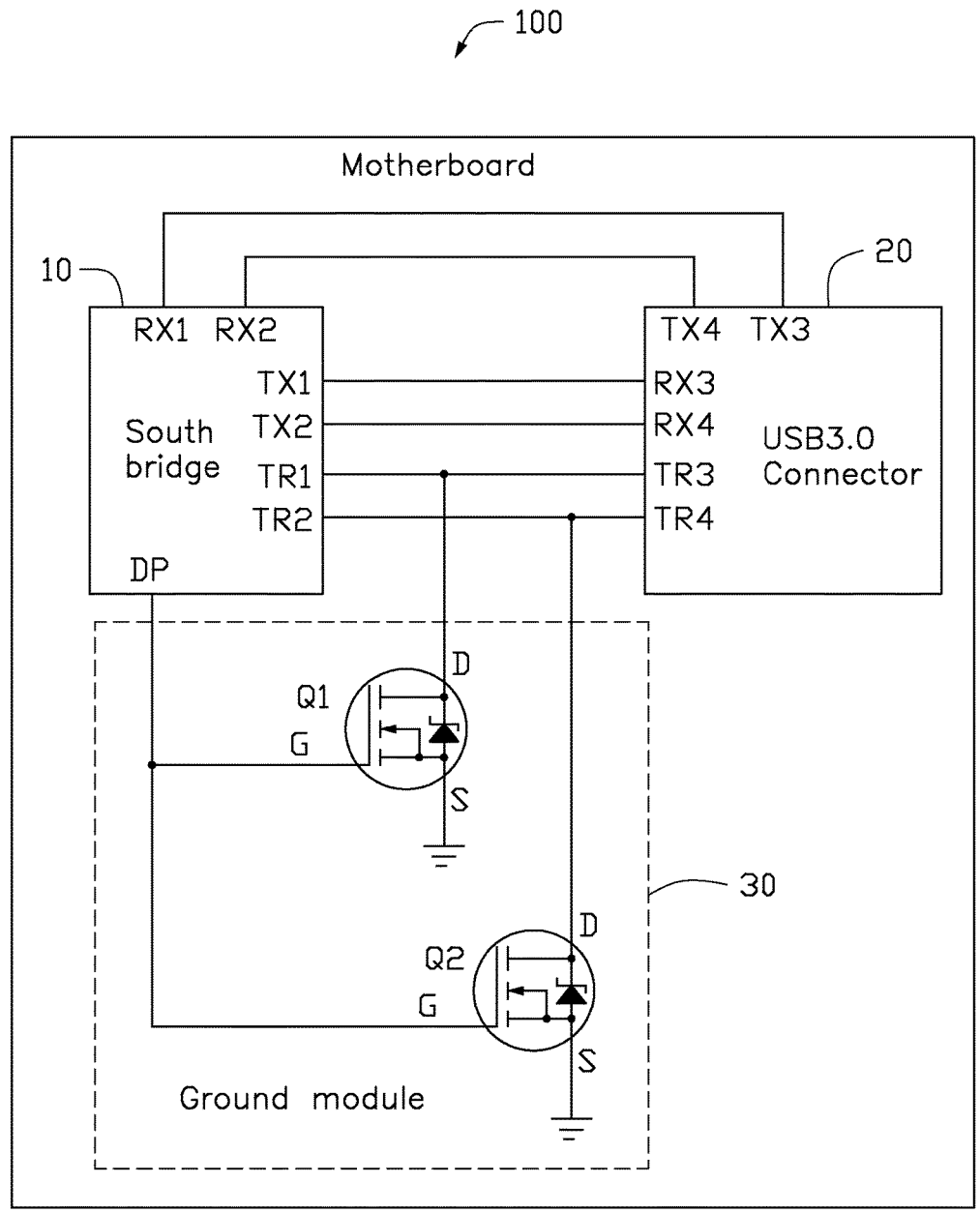
FIG. 2 is a diagrammatic view of the motherboard in FIG. 1.

FIG. 2 illustrates the schematic of the motherboard 100. The south bridge 10 comprises a first sending pin TX1 and a second sending pin TX2 for sending USB3.0 signals, a first receiving pin RX1 and a second receiving pin RX2 for receiving USB3.0 signals, a first transmitting pin TR1 and a second transmitting pin TR2 for transmitting USB2.0 signals, and an output pin DP for outputting a control signal.

The USB3.0 connector 20 comprises a third sending pin TX3 and a forth sending pin TX4 for sending USB3.0 signals, a third receiving pin RX3 and a forth receiving pin RX4 for receiving USB3.0 signals, and a third transmitting pin TR3 and a forth transmitting pin TR4 for transmitting USB2.0 signals.

The first sending pin TX1 is coupled to the third receiving pin RX3 and the second sending pin TX2 is coupled to the forth receiving pin RX4. The first receiving pin RX1 is coupled to the third sending pin TX3 and the second receiving pin RX2 is coupled to the forth sending pin TX4. The first transmitting pin TR1 is coupled to the third transmitting pin TR3 and the second transmitting pin TR2 is coupled to the forth transmitting pin TR4.

The ground module 30 comprises a first electronic switch Q1 and a second electronic switch Q2. First ends of the first electronic switch Q1 and the second electronic switch Q2 are coupled to the output pin DP for receiving the control signal. Second ends of the first electronic switch Q1 and the second electronic switch Q2 are grounded. A third end of the first electronic switch Q1 is coupled to the third transmitting pin TR3 and a third end of the second electronic switch Q2 is coupled to the forth transmitting pin TR4. In at least one embodiment, the first electronic switch Q1 and the second electronic switch Q2 can be n-channel field-effect transistors (FETs). The first ends of the first electronic switch Q1 and the second electronic switch Q2 are corresponding to gates of the FETs. The second ends of the first electronic switch Q1 and the second electronic switch Q2 are corresponding to sources of the FETs. The third ends of the first electronic switch Q1 and the second electronic switch Q2 are corresponding to drains of the FETs. In other embodiments, the first electronic switch Q1 and the second electronic switch Q2 can be npn bipolar junction transistors or any switches having a same function.

When the motherboard 100 is testing the USB3.0 signal, the output pin DP outputs a first control signal. The electronic switch Q1 and the second electronic switch Q2 are switched on after the first ends receive the first control signal. The third transmitting pin TR3 is grounded through the first electronic switch Q1 and the forth transmitting pin TR4 is grounded through the second electronic switch Q2, so that the USB2.0 signals transmitted between the south bridge 10 and the USB3.0 connector 20 are grounded. Then, the motherboard 100 can be further tested.

When the motherboard 100 is not testing the USB3.0 signal, the output pin DP outputs a second control signal. The electronic switch Q1 and the second electronic switch Q2 are switched off after the first ends receive the second control signal. The south bridge 10 and the USB3.0 connector 20 can send and receive USB2.0 signals through the first transmitting pin TR1, the second transmitting pin TR2, the third transmitting pin TR3, and the forth transmitting pin TR4. Then, USB2.0 signals and USB3.0 signals can be transmitted between the south bridge 10 and the USB3.0 connector 20. In at least one embodiment, the first control signal can be a high level signal, and the second control signal can be a low level signal.

As detailed above, the motherboard 100 has the south bridge 10 controlling the ground module 30 to operate, so that the USB2.0 signals transmitted between the south bridge 10 and the USB3.0 connector 20 are grounded. Then, the motherboard 100 can test the USB3.0 signal.

The embodiments shown and described above are only examples. Many details are well known by those in the art therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A motherboard comprising:
a south bridge;
an universal serial bus (USB) 3.0 connector coupled with the south bridge for transmitting USB2.0 signals and USB3.0 signals; and
a ground module coupled with the south bridge and the USB3.0 connector;
wherein the south bridge is configured to control the ground module to operate, when the ground module is operated, the USB2.0 signals transmitted between the south bridge and the USB3.0 connector are guided into the ground.

2. The motherboard of claim 1, wherein the south bridge comprises a first transmitting pin and a second transmitting pin for transmitting the USB2.0 signals and an output pin coupled to the ground module, the USB3.0 connector comprises a third transmitting pin coupled to the first transmitting pin and the ground module, and a forth transmitting pin coupled to the second transmitting pin and the ground module;
wherein the output pin outputs a first control signal when the motherboard is in test of USB3.0 signals, the ground module receives the first control signal, guiding the USB2.0 signals transmitted between the first transmitting pin and the third transmitting pin into the ground, and the USB2.0 signals transmitted between the second transmitting pin and the forth transmitting pin flows into the ground; and
wherein the output pin outputs a second control signal when the motherboard is not in test of USB3.0 signals, the ground module receives the second control signal, allowing the USB2.0 signals to be transmitted between the south bridge and the USB3.0 connector.

3. The motherboard of claim 2, wherein the ground module comprises a first electronic switch and a second electronic switch, first ends of the first electronic switch and the second electronic switch is coupled to the output pin, second ends of the first electronic switch and the second electronic switch is grounded, a third end of the first electronic switch is coupled to the third transmitting pin and a third end of the second electronic switch is coupled to the forth transmitting pin;
wherein the output pin outputs the first control signal when the motherboard is in test of USB3.0 signals, the electronic switch and the second electronic switch are switched on after the first ends thereof receiving the first control signal, the third transmitting pin is grounded through the first electronic switch and the forth transmitting pin is grounded through the second electronic switch, the USB2.0 signals transmitted between the south bridge and the USB3.0 connector are grounded; and
wherein the output pin outputs the second control signal when the motherboard is not in test of USB3.0 signals, the electronic switch and the second electronic switch are switched off after the first ends thereof receiving the second control signal, the USB2.0 signals is capable of being transmitted between the south bridge and the USB3.0 connector.

4. The motherboard of claim 3, wherein the first electronic switch and the second electronic switch are configured to be n-channel field-effect transistors (FETs), the first ends of the first electronic switch and the second electronic switch are corresponding to gates of the FETs, the second ends of the first electronic switch and the second electronic switch are corresponding to sources of the FETs, the third ends of the first electronic switch and the second electronic switch are corresponding to drains of the FETs.

5. The motherboard of claim 3, wherein the first electronic switch and the second electronic switch are configured to be npn bipolar junction transistors.

6. The motherboard of claim 2, wherein the south bridge comprises a first sending pin and a second sending pin for sending USB3.0 signals, and a first receiving pin and a second receiving pin for receiving USB3.0 signals, the USB3.0 connector comprises a third sending pin coupled to the first receiving pin, a forth sending pin coupled to the second receiving pin, a third receiving pin coupled to the first sending pin, and a forth receiving pin coupled to the second sending pin.

7. A motherboard comprising:
a south bridge comprising an output pin;
an universal serial bus (USB) 3.0 connector coupled to the south bridge for transmitting USB2.0 signals and USB3.0 signals; and
a ground module coupled to the output pin and the USB3.0 connector;
wherein the output pin outputs a first control signal to switch on the ground module, guiding the USB2.0 signals transmitted between the south bridge and the USB3.0 connector into the ground.

8. The motherboard of claim 7, wherein the south bridge further comprises a first transmitting pin and a second transmitting pin for transmitting the USB2.0 signals, the USB3.0 connector comprises a third transmitting pin coupled to the first transmitting pin and the ground module, and a forth transmitting pin coupled to the second transmitting pin and the ground module; and
wherein the output pin outputs a second control signal to switch off the ground module, allowing the USB2.0 signals to be transmitted between the south bridge and the USB3.0 connector.

9. The motherboard of claim 8, wherein the ground module comprises a first electronic switch and a second electronic switch, first ends of the first electronic switch and the second electronic switch is coupled to the output pin, second ends of the first electronic switch and the second electronic switch is grounded, a third end of the first electronic switch is coupled to the third transmitting pin and a third end of the second electronic switch is coupled to the forth transmitting pin;
wherein the output pin outputs the first control signal, the electronic switch and the second electronic switch are switched on after the first ends thereof receiving the first control signal, the third transmitting pin is grounded through the first electronic switch and the forth transmitting pin is grounded through the second electronic switch, the USB2.0 signals transmitted between the south bridge and the USB3.0 connector are grounded; and wherein the output pin outputs the second control signal, the electronic switch and the second electronic switch are switched off after the first ends thereof receiving the second control signal, the USB2.0 signals is capable of being transmitted between the south bridge and the USB3.0 connector.

10. The motherboard of claim 9, wherein the first electronic switch and the second electronic switch are configured to be n-channel field-effect transistors (FETs), the first ends of the first electronic switch and the second electronic switch are corresponding to gates of the FETs, the second ends of the first electronic switch and the second electronic switch are corresponding to sources of the FETs, the third ends of the first electronic switch and the second electronic switch are corresponding to drains of the FETs.

11. The motherboard of claim 9, wherein the first electronic switch and the second electronic switch are configured to be npn bipolar junction transistors.

12. The motherboard of claim 8, wherein the south bridge comprises a first sending pin and a second sending pin for sending USB3.0 signals, and a first receiving pin and a second receiving pin for receiving USB3.0 signals, the USB3.0 connector comprises a third sending pin coupled to the first receiving pin, a forth sending pin coupled to the second receiving pin, a third receiving pin coupled to the first sending pin, and a forth receiving pin coupled to the second sending pin.

* * * * *